UNITED STATES PATENT OFFICE.

HORATIO N. FRYATT, OF BELLEVILLE, NEW JERSEY.

IMPROVEMENT IN DECOLORIZING SIRUPS.

Specification forming part of Letters Patent No. 32,622, dated June 25, 1861.

*To all whom it may concern:*

Be it known that I, HORATIO N. FRYATT, of Belleville, in the county of Essex and State of New Jersey, have invented a new and Improved Process of Decolorizing Saccharine Juices, Sirups, or Sugar Solutions; and I do hereby declare that the following is a full and exact description thereof.

The state of the art of decolorizing sugar solutions in the course of the process of refining raw sugars, so as to render them white or colorless previous to their concentration, as I find it in present use, is by bringing the solution in contact with bone-black or animal carbon, as follows: A solution of sugar previously defecated or clarified, so as to remove all flotant matter, is usually passed through a mass of bone-black. After warming the bone-black with hot water, and in the filtration of the sirup through the black, the color is found to be extracted, so that the sirup, when it runs out of the bottom of the vessel containing the bone-black, is found to be colorless at the commencement, gradually becoming straw-colored, and gradually darker until the bone-black is supposed to have lost its power. Then a quantity of hot water is passed through, and this water, becoming sweet by dissolving the sugar remaining in the bone-black, requires to be evaporated to save the sugar it contains, or else used as a solvent for a new quantity of sugar, and the quantity of bone-black required for this operation, known in the art of refining as "De Rosening the sirup," is one pound of black for one pound of sugar, or thereabout, when the highest stage of whiteness is called for.

The method pursued by me and the nature of my invention I hereby describe to enable others skilled in the art of making and refining sugars to use my invention, and is as follows:

An ordinary centrifugal machine—such as is used in the separation of sirups from sugar—is first charged, either in an annular space between an inner and the outer rim, with bone-black or other substance capable of decolorizing sugar solutions, or such a centrifugal machine without an inner rim, with the cover closing from the outer edge toward the center, into which, after it is in motion, is poured a mixture of granulated bone-black or other decolorizing substance mixed with water or other fluid, permitting the bone-black or other substance to arrange against the periphery on its inner side, and by centrifugal force parting with such fluid. The sugar solution is then permitted to fall into this centrifugal machine, and by centrifugal force to be driven through and from the bone-black or substitute, so that in its passage it shall be robbed of color, and when used in combination with the centrifugal machine, as above stated, its decolorizing power is many times greater than when the sugar solution is suffered to pass through it in a state of rest, and I suppose this increased power of decolorizing is due to the fact that by centrifugal force the sirup passes through the body of the particles, as well as passing over their surfaces, which, while the mass is in a static condition, as in the ordinary "De Rosening filter," does not occur, the sirup either passing over the surface of the particles of bone-black or substitute, or, if through them, only in degree, and not so perfectly as when assisted in such passage by centrifugal force, thus enabling the operator to use a much less quantity of bone-black or other substitute to produce a greater amount of decolorization.

I do not claim the use of a centrifugal machine for the separation of sirups from the sugar; nor do I claim the use of bone-black as an agent for the decolorization of sugar or sugar juices or solutions as such; but What I do claim, and desire to secure by Letters Patent, is—

The use of bone-black or any other substance capable of decolorizing fluids, assisted by centrifugal force, as in the ordinary centrifugal machine, as a mode of and for the purpose of decolorizing saccharine juices, sirups, or sugar solutions passed through it.

September 24, 1860.

H. N. FRYATT.

Witnesses:
   EDWARD GREENE,
   THEODORE PAYNE.